United States Patent [19]

Scibor-Rylski

[11] 4,305,123
[45] Dec. 8, 1981

[54] PROGRAMMABLE CONTROLLER FOR THE MECHANISM OF AN INDUSTRIAL TRUCK

[75] Inventor: Marek V. T. Scibor-Rylski, Surrey, England

[73] Assignee: Lansing Bagnall Limited, Basingstoke, England

[21] Appl. No.: 108,155

[22] Filed: Dec. 28, 1979

[30] Foreign Application Priority Data

Jan. 3, 1979 [GB] United Kingdom ............... 00149/79

[51] Int. Cl.³ .............................................. G05B 19/23
[52] U.S. Cl. .............................. 364/189; 235/92 MP; 318/601; 364/424
[58] Field of Search ....................... 364/474, 424, 120; 235/92 MP; 340/147 MT, 146.2; 318/569, 601

[56] References Cited
U.S. PATENT DOCUMENTS

Re. 30,016  5/1979  Hohn ................................. 364/474
3,752,969  8/1973  Kiffmeyer et al. ............. 235/92 MP
4,013,875  3/1977  McGlynn ........................... 364/424
4,038,890  8/1977  Winget .............................. 364/474
4,181,848  1/1980  Iwase ................................ 364/562

Primary Examiner—Errol A. Krass
Attorney, Agent, or Firm—Cushman, Darby & Cushman

[57] ABSTRACT

A controller for an auxiliary mechanism of an industrial truck includes a sensor which detects movement of the mechanism and provides signals denoting increments of that movement. A counter receives those signals and thereby provides a count denoting the position of the mechanism along its range of movement. A memory is controllable to provide one of a plurality of stored representations for comparison with the count and a comparator compares the count with a representation made available from the memory to provide a signal for controlling the movement of the mechanism. A keyboard is provided for effecting storage in the memory of representations of different positions along the mechanism's range of movement.

13 Claims, 2 Drawing Figures

PROGRAMMABLE CONTROLLER FOR THE MECHANISM OF AN INDUSTRIAL TRUCK

BACKGROUND OF THE INVENTION

This invention relates to industrial trucks, such as fork-lift trucks, order pickers and other trucks in which it is necessary or desirable to control automatically the extent of an auxiliary movement such as the height to which a load, or an operator, or both are raised. The invention is particularly intended to provide a means by which lifting to one of a multiplicity of preselected heights can be simply and accurately repeated by an operator.

SUMMARY OF THE INVENTION

In a preferred form, the present invention provides a controller for an auxiliary mechanism of an industrial truck, and the controller comprises a sensor which detects movement of the mechanism and provides signals denoting increments of that movement, a counter which receives those signals and thereby provides a count denoting the position of the mechanism along its range of movement, a memory which is controllable to provide one of a plurality of stored representations for comparison with the count, means for comparing the count with a representation made available from the memory to provide a signal for controlling the movement of the mechanism and means for effecting storage in the memory of representations of different positions along the mechanism's range of movement.

One of the important features of the invention is the aforementioned memory, which in practice can store signals representing a multiplicity of different positions such as heights, each related to, for example, different levels of racking in a warehouse. One benefit of using such a memory is that the particular heights which are read out from the memory and are used to control the movement of the lifting mechanism need not be fixed but can be varied, as described hereinafter, to suit the particular circumstances of use of the truck.

There may be more than one counter; the relationship between the count held at any time in a counter and the position of the mechanism depends on the purpose of the control signal which is produced on detection of coincidence between the count and the representation made available from the memory. For example, one counter may control the stopping of the movement of the mechanism; the count of this counter, or its difference from a fixed datum, may directly represent the position of the mechanism. However, the relationship between the count and the height of the truck may be offset so that the detection of coincidence as aforesaid provides a signal which merely decelerates the mechanism, which would usually be traversed at a fixed speed.

An important provision according to the invention is the transfer to the memory of a count held at a particular time by a counter, particularly the one that is used to determine where the mechanism shall stop. For this purpose, the controller may include a keyboard which is operable to store the content of such a counter in a storage location (i.e. a particular address) in the memory which is determined by the operation of a particular key or keys. Such a provision greatly facilitates the subsequent automatic control of the mechanism, because the position at which the mechanism should stop may be determined by the operator during a trial operation, stored in the memory by operation of the appropriate keys, and thereafter furnished as required by operation of, for example, the same key or keys. It is thereby readily possible to provide automatic stopping of the mechanism at a variety of positions limited in number only by the storage capacity of the memory and the number of discrete increments of movement that the sensor detects for the whole range of movement of the mechanism. Moreover, with the aid of at least two counters, one of which is offset automatically in accordance with the setting of the other, it is readily possible to ensure that for any particular selection of position for the stopping of the lifting mechanism, the point at which the lifting mechanism begins to slow down is adjusted automatically.

Although, in the foregoing, reference has been made to the control of the height of a lifting mechanism, the movement of other mechanisms on a truck could be controlled in an analogous manner.

DESCRIPTION OF THE PREFERRED EMBODIMENT

Figure 1:
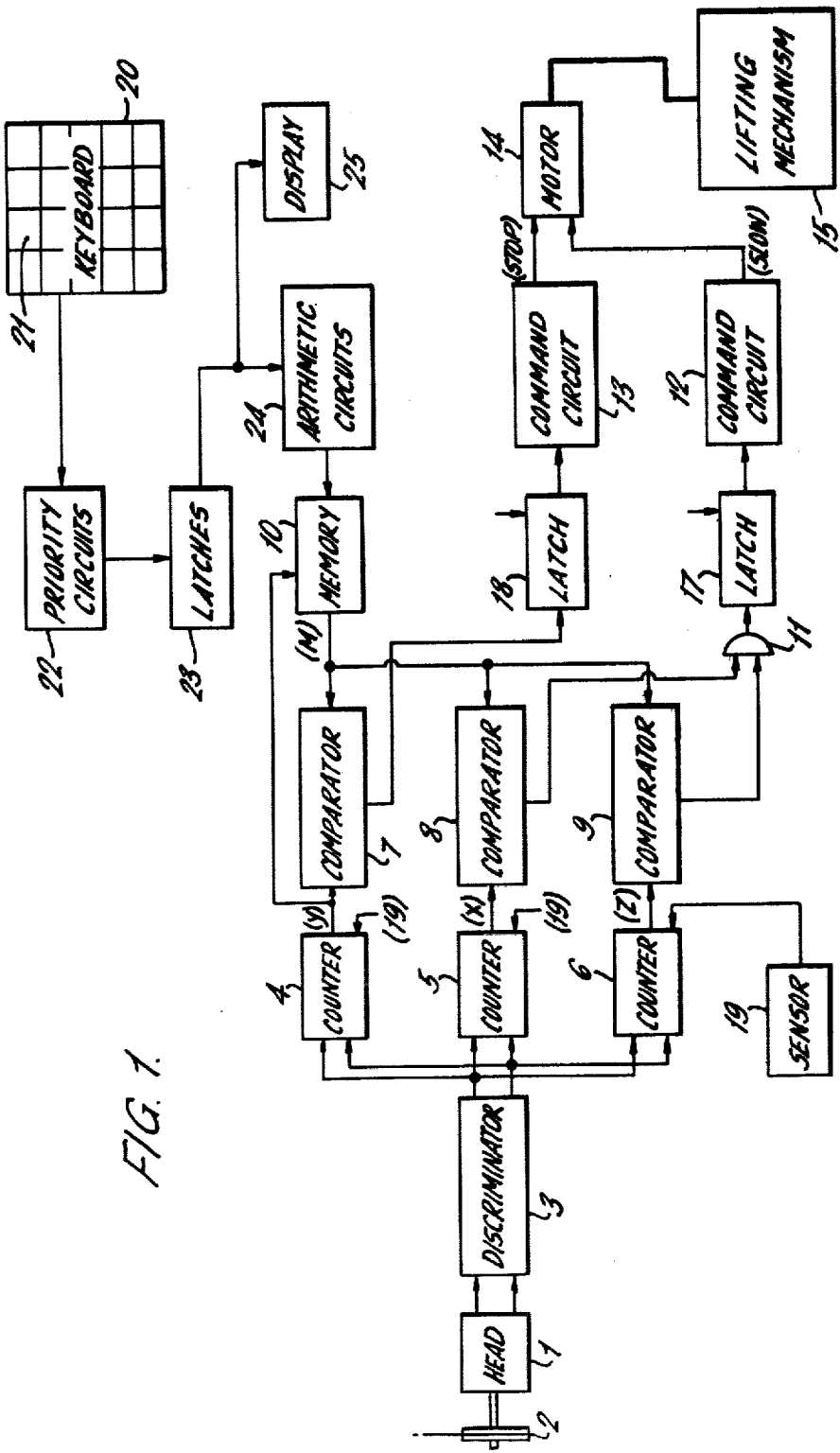
FIG. 1 is a schematic diagram of the principal parts of a controller for the height of a lifting carriage of a fork-lift truck.

The controller includes a transducer which provides pulse signals each representing increments of vertical movement of the forks and a signal denoting the sense of the movement. This transducer, conveniently termed "head", might be coupled to the lifting carriage in any one of several suitable ways. Preferably, but not necessarily, the head is anchored to the chassis of the truck and contains an encoded disc disposed on the shaft of a pulley around which passes a wire which has one end attached to the lifting carriage, in known manner, so that as the lifting carriage moves up and down, the pulley is rotated accordingly. Movement of the pulley is sensed optically by sensors which in known manner produce quadrature wave trains which are converted by means of a discriminator into the signals denoting increments of movement and the sense of the movement respectively. The particular form of the head and the associated circuits is not important so far as the rest of FIG. 1 is concerned, and might be embodied by arrangements of known form; for the present, therefore, it will merely be supposed that the head 1 cooperates with a pulley wire 2 and a discriminator 3 to provide the aforementioned signals for processing.

The signals provided by the head unit are counted in three bidirectional binary counters 4, 5 and 6. Although all three counters are driven by the same output, so that they increment similarly, they are reset to different datums. If the counters, 4, 5 and 6 provide at any time counts of y, x and z respectively, the quantities x-y and y-z represent respectively the distance between the point at which the lifting mechanism when travelling upwards begins to slow down and the point at which it stops and the distance between the point at which the lifting mechanism, travelling downwards, begins to slow down and the point at which it stops. The 'slow-down' bands are readily adjustable.

The contents of the respective counters are compared with a signal read out from a selected address in a memory 10 by means of respective comparators 7, 8 and 9. If the output of the memory be denoted M, then the counters 8 and 9 detect whether x is greater than M or M is greater than z respectively, and provide respective outputs which are combined in an OR circuit 11 feeding a command circuit 12. If M=y, which equality is detected by the comparator 7, the movement of the lifting mechanism should stop; the comparator 7 signals a command circuit 13 which as the circuit 12 is coupled to the driving motor 14 for the lifting mechanism 15.

It will be understood that coincidence between the particular count (such as y,) and the output of the memory M exists only for one discrete height, and that, as usually happens, overshoot or bounce of the lifting mechanism would cause the loss of the command signal. However, the circuits 12, 13 are preceded by respective electrical latches 17 and 18 which preserve the respective command function instigated by the detection of coincidence, so that for example a "stop" command endures notwithstanding the immediate loss of coincidence between the content of the counter 4 and the output of the memory 10. The latches are released on the operation of any key in a keyboard yet to be described.

The motor is controllable by the operator otherwise so that, for example, the forks may be raised or lowered to a height which is not yet stored in the memory 10; but it may be set for fully automatic operation.

A safety circuit, for limiting the height to which the lifting mechanism is traversed, may be constituted by another digital comparator which compares the y count, or the more significant bits thereof, with a present value, which may be provided by any suitable means, the comparator actuating an interlock which prevents the application of tractive power to the lifting mechanism if the count y is greater than the present value or the mast about to be elevated above a safe height.

The counters 4, 5 and 6 are reset to their respective datums when the forks of the truck are grounded; a sensor 19 senses the grounding of the forks and provides a reset signal accordingly.

The content of the counter 4 is not only made available for comparison with the output of the memory 10, but is also continuously available for storage in a selected location in the memory. The addressing of the memory is controlled by a keyboard 20. In this example the keyboard has twenty-six keys 21, of which one cancels a selection made by a key, twenty "address" keys are numbered from (for example) one to twenty inclusive, two keys switch the keyboard on and off respectively, one is a programme key and two, known as + and − respectively, are used to denote whether the selected level is higher or lower than a racking level. When a key is pressed, a corresponding coding is after passage through a priority control circuit 22 routed to a location in a latch circuit 23 (i.e. a buffer store) which is coupled to an arithmetic unit 24, which causes the generation of an address in memory corresponding to the latched code generated by an address key and, consequently, the read-out of the contents of the respective location in memory. If the "programme" key is pressed, that location will be caused to receive the content of the counter 4 (viz. the y count).

This arrangement permits the storage of a multiplicity of heights, and the selection of any height thus fed into the memory for stopping the lifting mechanism in a subsequent operation.

It is preferable that the memory be a CMOS memory or other digital memory which consumes little power from the units small storage battery. Thus the contents of the memory may be preserved even if the main electrical supply of the truck is switched off, as it usually is when a task is finished.

The keyboard is associated with a display panel 25 that indicates whichever keys have been operated. The control signals for the display are obtained from the store 23.

Figure 2:
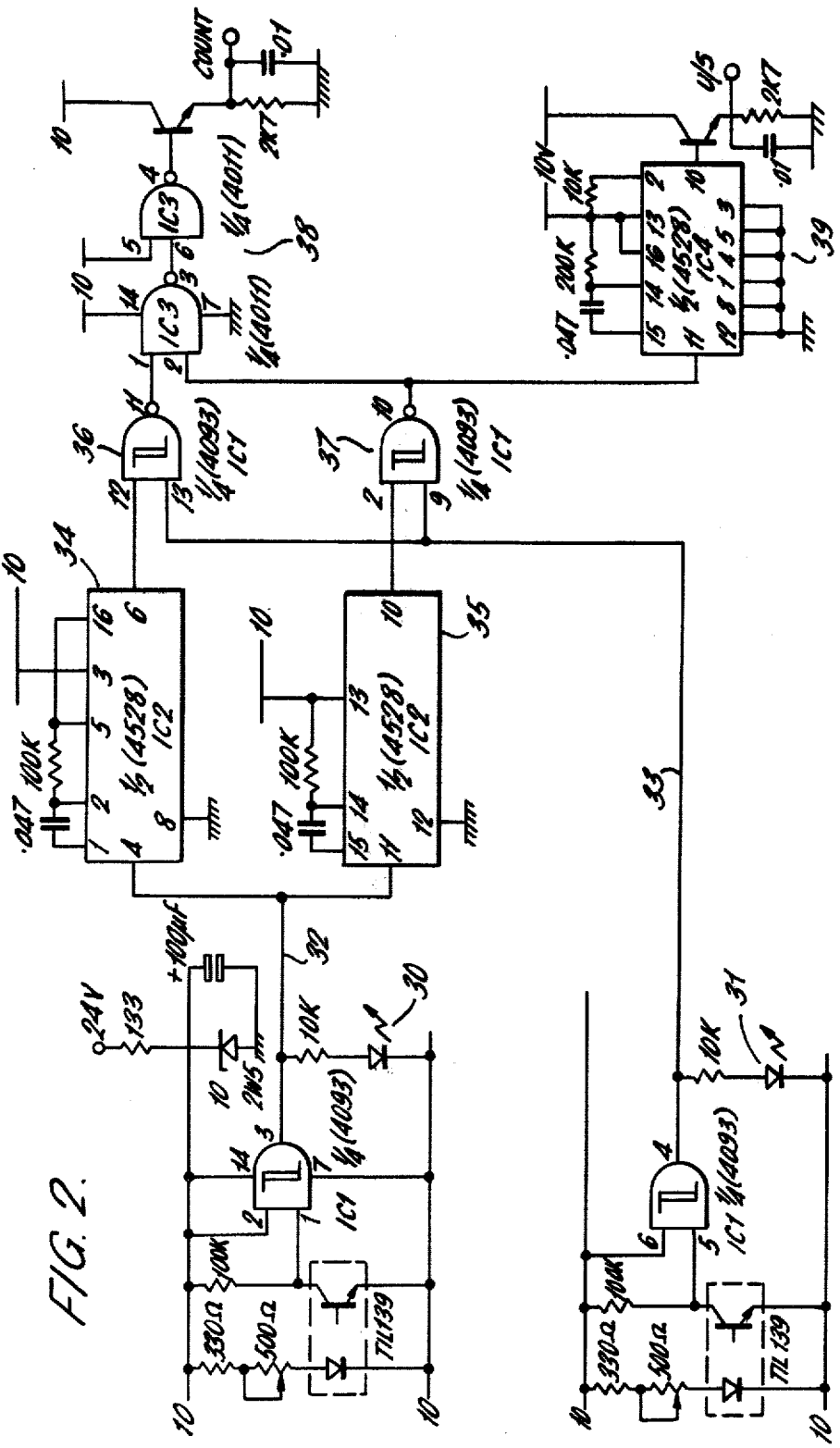
FIG. 2 is a schematic diagram of a discriminator and sensors which constitute part of the controller.

FIG. 2 illustrates one form of the discriminator and the sensors; the latter (30 and 31) provide the wavetrains as aforementioned on lines 32 and 33 respectively. The discriminator is arranged on the presumptions that the two wave-trains constitute a 'count' and an 'up-/down' indication respectively, and that low to high transitions (of the former) are counted for one direction of movement and high to low transitions are counted for the other direction of movement. The first line feeds two similar delays 34, 35 (constituted by monostable circuits) which feed one input of a respective one of the two coincidence gates 36, 37, the other inputs of which are connected to receive by line 33 the second wavetrain. Each of the coincidence gates is connected to an input of an OR-gate 38, and one of the coincidence gates triggers a delay 39 (constituted by a monostable circuit) providing twice the period of delay as the aforementioned delays. The outputs, defining counting signals and sense of counting respectively, are provided by the OR-gate and the last-mentioned delay. The arrangement discriminates against false counts produced by bouncing of the lifting mechanism and such-like.

We claim:

1. A controller for an auxiliary mechanism of an industrial truck, comprising:
    a sensor which is coupled to detect movement of the said mechanism and provides signals denoting increments of that movement:
    a counter which receives the said signals and thereby provides a count denoting the position of the mechanism along its range of movement;
    a memory which is controllable to provide a designated one of a plurality of stored representations for comparison with said count;
    means, cooperating with said memory for designating one of said stored representations;
    means for comparing the count with said designated representation made available from the memory to provide a signal for controlling the movement of the mechanism;
    means for effecting storage in the memory of signals denoting different positions along the range of movement; and
    means for transferring a count held by the counter to the memory for storage as one of said plurality of representations.

2. A controller according to claim 1, further comprising a keyboard operable by a human operator to provide for the storage of the said count in a storage location of which the address is determined by the operation of a particular selection from said keys and means responsive to operation of the selected key or keys to address the memory to make the stored count available for comparison.

3. A controller according to claim 1, in which there is a plurality of said counters, of which the counts are offset from each other, and a corresponding number of comparators for comparison of the content of the respective counter with the representation made available for comparison by the memory, the respective comparators instituting different signals for control of the movement of the mechanism.

4. A controller according to claim 3, in which one of the comparators institutes the stopping of the mechanism and a comparator for another counter institutes deceleration of the mechanism.

5. A controller according to claim 4, further comprising a sensor responsive to the arrival of the mechanism of a limiting position at one end of a range of movement resets the counter or counters.

6. A controller according to claim 1, further comprising sensors responsive to increments of movement of said mechanism to provide two quadrative wavetrains and a discriminator responsive to said wavetrains for providing a first output signal representing increments of movement in accordance with transitions in one of said trains and a second output signal representing the directional sense of the movement, wherein the discriminator comprises two coincidence gates each disposed to receive the wavetrains, means preceding the coincidence gates for delaying one of the wavetrains relative to the other, a first output circuit coupled to receive signals indiscriminately from the coincidence gates and a second output circuit, including a delay, coupled to receive signals from one of the coincidence gates.

7. A controller for an auxiliary mechanism of an industrial truck, comprising:
 a sensor which is coupled to detect movement of the said mechanism and provides signals denoting increments of that movement;
 a counter which receives said signals and thereby provides a count denoting the position of the mechanism along its range of movement;
 a memory which is controllable to provide one of a plurality of stored representations for comparison with the said count;
 means for comparing the count with a representation made available from the memory to provide a signal for controlling the movement of the mechanism;
 means for effecting storage in the memory of signals denoting different positions along the range of movement;
 a keyboard means, operable by a human operator, for effecting storage of said count by said memory in a storage location of which the address is determined by the operation of a particular selection from said keys; and
 means responsive to operation of the keyboard to address the memory to make the stored count available for comparison.

8. A controller for an auxiliary mechanism of an industrial truck, comprising:
 a sensor which is coupled to detect movement of the said mechanism and provides signals denoting increments of that movement;
 a plurality of counters each of which receives said signals and thereby provides a respective one of a plurality of counts denoting the position of the mechanism along its range of movement, said counts being offset from each other;
 a memory which is controllable to provide one of a plurality of stored representations for comparison with said counts;
 a plurality of comparators each for comparing a respective one of said counts with a representation made available from the memory to provide a respective one of a plurality of different signals for controlling the movement of the mechanism; and
 means for effecting storage in the memory of signals denoting different positions along the range of movement.

9. A controller according to claim 8, further comprising means for transferring counts held by the counters to the memory.

10. A controller according to claim 8, further comprising selection means operable by a human operator to provide for the storage of at least one of said counts in a storage location of which the address is determined by the operation of a particular selection from said selection means and means responsive to operation of the selection means to address the memory to make the stored count available for comparison.

11. A controller according to claim 8, in which one of said comparators institutes the stopping of the mechanism and another one of said comparators institutes deceleration of the mechanism.

12. A controller according to claim 11, further comprising a sensor responsive to the arrival of the mechanism of a limiting position at one end of a range of movement to reset one of said counters.

13. A controller for an auxiliary mechanism of an industrial truck, comprising:
 a sensor which is coupled to detect movement of said mechanism and provides signals denoting increments of that movement;
 a counter which receives the said signals and thereby provides a count denoting the position of the mechanism along its range of movement;
 a memory which is controllable to provide one of a plurality of stored representations for comparison with said count;
 means for comparing the count with a representation made available from the memory to provide a signal for controlling the movement of the mechanism;
 means for effecting storage in the memory of signals denoting different positions along the range of movement;
 sensors responsive to increments of movement of said mechanism to provide two quadrature wavetrains; and
 a discriminator responsive to said wavetrains for providing a first output signal representing increments of movement in accordance with transitions in one of said trains and a second output signal discriminator comprising two coincidence gates each disposed to receive the wavetrains, means preceding the coincidence gates for delaying one of the wavetrains relative to the other, a first output circuit coupled to receive signals indiscriminately from the coincidence gates and a second output circuit, including a delay, coupled to receive signals from one of the coincidence gates.

* * * * *